United States Patent
Boucher et al.

(10) Patent No.: US 6,715,410 B2
(45) Date of Patent: Apr. 6, 2004

(54) BALING CHAMBER HAVING ADJUSTABLE CROSS SECTION

(75) Inventors: Jean-Francois Boucher, Gray (FR); Jocelyn Motret, Gray (FR)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/214,963

(22) Filed: Aug. 8, 2002

(65) Prior Publication Data

US 2003/0029331 A1 Feb. 13, 2003

(30) Foreign Application Priority Data

Aug. 10, 2001 (DE) .......................... 101 45 691

(51) Int. Cl.⁷ ................................ B30B 9/30
(52) U.S. Cl. ...................................... 100/191
(58) Field of Search .................... 100/41, 43, 189, 100/191, 192, 70 A, 148, 147; 56/341, 432, 440, 443, 446

(56) References Cited

U.S. PATENT DOCUMENTS

| | | | | |
|---|---|---|---|---|
| 4,037,528 A | * | 7/1977 | White et al. | 100/191 |
| 4,489,648 A | * | 12/1984 | Naaktgeboren | 100/191 |
| 5,619,842 A | | 4/1997 | Brubaker et al. | |
| 5,735,199 A | * | 4/1998 | Esau et al. | 100/191 |
| 5,819,643 A | * | 10/1998 | McIlwain et al. | 100/43 |
| 5,950,410 A | | 9/1999 | O'Brien et al. | 56/341 |
| 6,026,741 A | * | 2/2000 | Lippens et al. | 100/41 |

FOREIGN PATENT DOCUMENTS

| | | |
|---|---|---|
| DE | 43 41 609 | 6/1995 |
| DE | 298 11 991 U1 | 11/1999 |
| EP | 0 152 970 | 8/1985 |
| EP | 0 536 781 | 4/1993 |
| EP | 0 726 026 | 8/1996 |
| EP | 0 745 320 | 12/1996 |
| EP | 0940 072 | 9/1999 |
| FR | 1 340 188 | 9/1963 |

OTHER PUBLICATIONS

WO 98/14320 World Intellectual Property Organization, dated Apr. 9, 1998.

* cited by examiner

Primary Examiner—Allen Ostrager
Assistant Examiner—Jimmy T Nguyen

(57) ABSTRACT

A baler includes a baling chamber configured for forming parallelepiped bales. The baling chamber has a top wall that is adjustable toward and away from a bottom wall of the chamber. The top wall is provided with a plurality of transversely spaced, parallel slots extending lengthwise of the chamber. A baling piston is mounted for movement within the baling chamber and includes an upper part which is defined by a plurality of transversely spaced ribs that are respectively received in the slots in the top wall and accommodate the movement of the latter during adjustment.

3 Claims, 3 Drawing Sheets

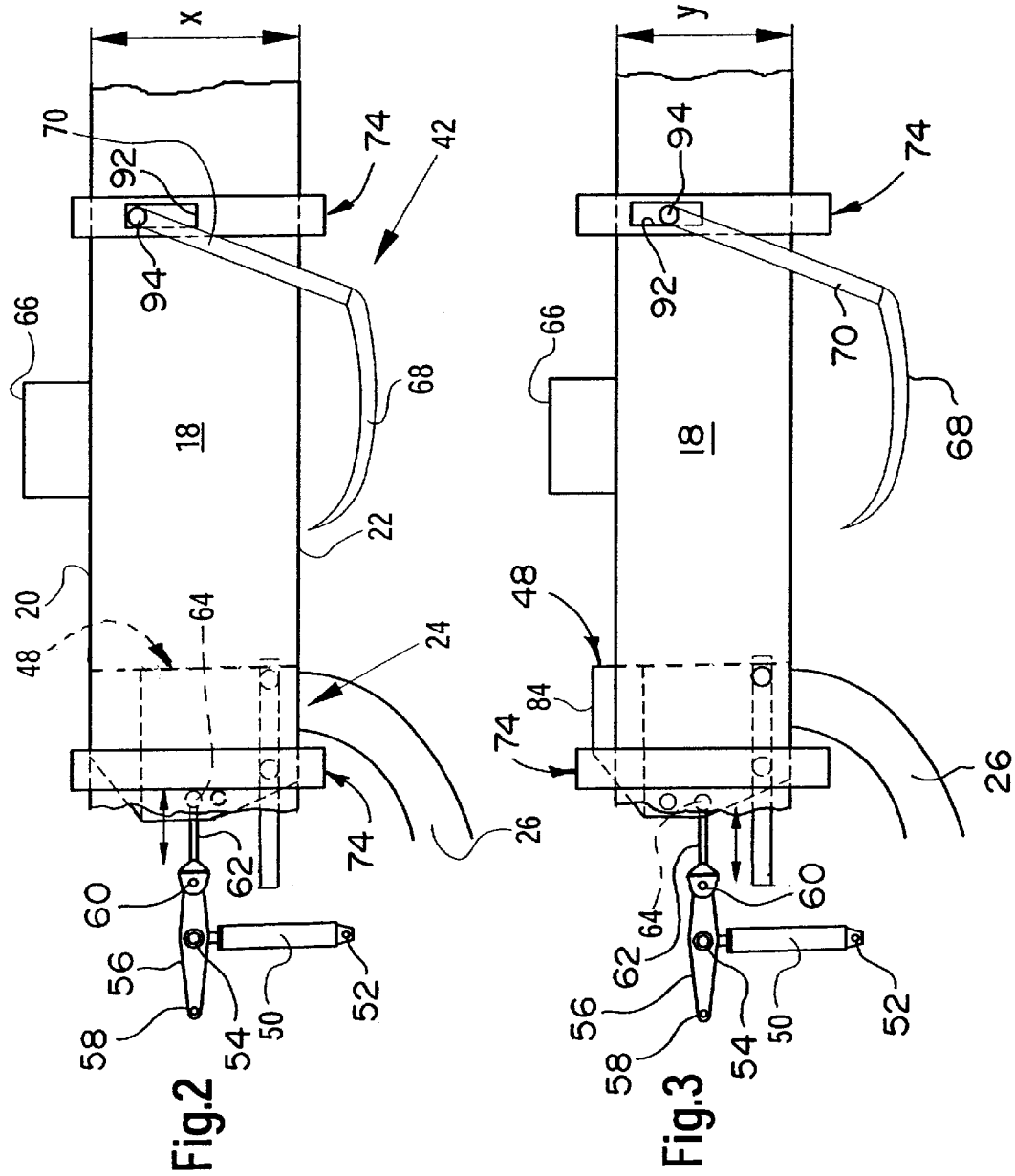

US 6,715,410 B2

BALING CHAMBER HAVING ADJUSTABLE CROSS SECTION

FIELD OF THE INVENTION

The invention concerns a baler with a parallelepiped or slab-shaped baling chamber and a baling piston enclosed in it that is free to move.

BACKGROUND OF THE INVENTION

The prospectus "GREENLAND Large Baler Vario Industry", no publication date, discloses a large baler with a baling channel that can be adjusted in 5 cm. steps between a height of 0.65 m. and 0.8 m. In this way bales of different dimensions can be produced.

The problem underlying the invention is seen in the fact that the conversion to a different channel cross section requires approximately one day. Furthermore at present a greater range of channel cross sections is being demanded.

SUMMARY OF THE INVENTION

According to the present invention, there is provided a baler for making parallelepiped bales and having an easily adjustable baling chamber.

A broad object of the invention is to provide a baler having a baling chamber for forming parallelepiped bales and the cross section of which can be easily changed as desired and made to conform to the size, particularly the height, of the transport vehicle available for the particular field.

Another object of the invention is to provide an adjustable baling chamber, as set forth in the preceding object, together with an adjustable needle arrangement whereby the needles and with them the entire tying arrangement is located on a movable upper chamber housing part, so that the spacial arrangement of the needles relative to the tying arrangement does not change when this part is repositioned, so that a secure engagement of the needle points in the knot tying device is assured.

Another object of the invention is to provide an adjustable baling chamber, as set forth in the foregoing objects, and together with this to incorporate structure providing the ability to reposition a drive, for example, a flywheel drive with a crank arm or a hydraulic motor together with the repositioning of the upper chamber part such that the force of the driver is always applied to the center of the baling piston so that it occupies a secure and centered end position.

A more specific object is to provide spindles, spreader linkages and the like as possible actuators for the repositioning of the upper chamber part, or more advantageously to use of motors, particularly remote controlled motors since these are simple devices which can transmit large forces.

Another specific object is to construct the side surfaces of the baling channel such as to cover the entire height, so no crop to be baled can escape and cause jams. If the side walls extend in one-piece configuration from above or below, a smooth surface results with low frictional resistance; if upper and lower walls are provided, that overlap vertically, then the entire side walls do not project either at the top or at the bottom. Depending on the dimensions selected such a large vertical repositioning movement can be attained so that an access from the outside into the baling chamber is possible.

A light-weight configuration of the baler can be attained by arranging the large components, particularly the cover or top and the bottom, as well as the side walls of the baling chamber, as a light-weight design so that the forces are absorbed by a few massive components, for example, the repositioning arrangement, which surround the baling chamber and carry and reposition the chamber top and portions of the side walls.

Another object of the invention is to configure an upper region of the baling piston as a collection of ribs such that a generally closed baling surface of the baling piston results, which leads to a uniform compression. The baling piston can be subdivided actually, not only conceptually, into an upper and a lower part. Slots in the chamber top or cover, for example, as an alternative to a large opening have the advantage that the ribs can extend through them and that the cover encloses the baling chamber at the sides as much as possible. The change of the cross section of the baling chamber can then be performed by lowering or raising the cover and letting the ribs extend to a greater or lesser distance through the slots.

The actual subdivision of the baling piston into two parts leads to a simplification of the manufacturing process.

The covering of the baling chamber at its sides does not stand in the way of a repositioning in height if the side walls extend into slots in the moving or the stationary part of the housing and are able to penetrate more or less deeply into the slots.

The accommodation of the position of the needles to the knot tying devices can be accomplished easily if openings are provided in the base body through which the needle support arms and journals connected to the movable part of the repositioning arrangement can extend.

If instead of a change in the height of the bale, its width can be varied, not only the height of the platform of the transport vehicle can be accommodated, but its length and width can be accommodated as well and an optimum loading can be achieved. In principle the repositioning arrangement would only need to be rotated through 90° and extended in the horizontal direction. The piston ribs would then not be extended vertically, but horizontally. If the supply channel is made to accommodate the cross section or is equipped with guide vanes a uniform supply across the entire width is assured.

BRIEF DESCRIPTION OF THE DRAWINGS

FIG. 2 is a schematic left side view of a baling chamber of the baler shown in a maximum height condition.

FIG. 3 is a schematic left side view like that of FIG. 2, but showing the baling chamber adjusted to a minimum height condition.

DESCRIPTION OF THE PREFERRED EMBODIMENT

Figure 1:
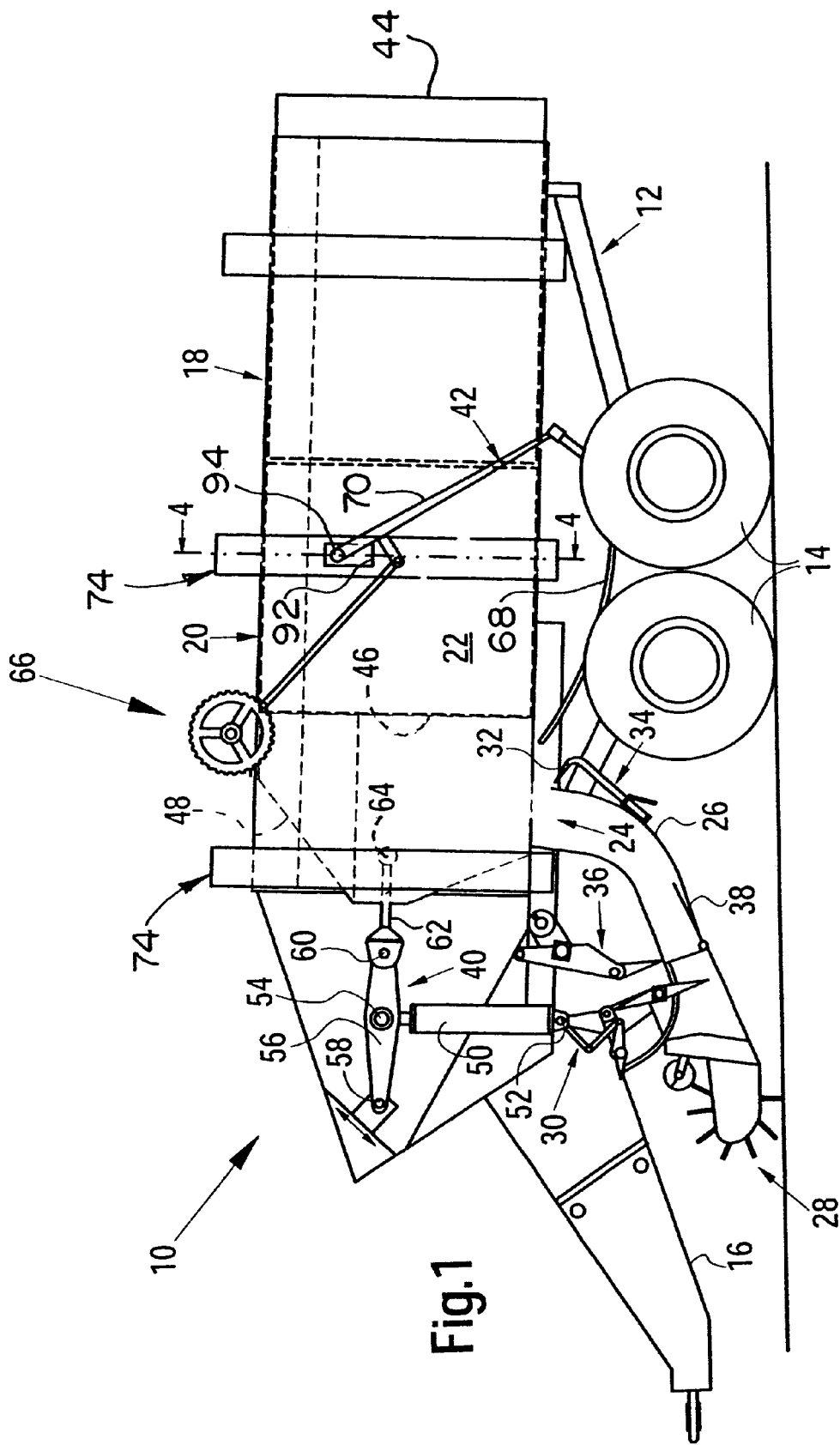
FIG. 1 is a schematic left side elevational view of a baler having a baling chamber constructed for adjustment in accordance with the invention.

FIG. 1 shows a baler 10 in the form of a large baler for the production of parallelepiped or slab-shaped bales, that includes a frame 12 supported on the ground by support wheels 14 in a tandem arrangement. A towbar or tongue 16 is connected to, and projects forwardly from, a front end of the frame 12 and is configured in such a way that it can be connected to a towing vehicle, such as an agricultural tractor, not shown, which is equipped with a power take-off shaft in order to deliver power to drive various components of the baler 10. A baling chamber 18 or an enclosure of rectangular cross section is formed partially by an upper housing part 20 and a lower housing part 22, where the lower housing part 22 is equipped with a crop inlet 24 which is connected to a curved supply channel or duct 26, that is used as a pre-compression chamber, as is described in the following. A take-up arrangement 28 in the form of a pick-up together with a center-feed screw conveyor is arranged ahead of the supply channel 26, in order to take up a swath or windrow of crop from the ground and to deliver it to a compression fork 30. The fork 30 is used to compress crop in the supply channel 26, until a load of pre-selected density has collected downstream of fingers 32 of a retaining arrangement 34 mounted so as to pivot between a retaining position in which the fingers 32 project into the supply channel 26 in the vicinity of the crop inlet 24, and a supply position, in which the fingers 32 are retracted from the supply channel 26, as shown, in order to make it possible for a load of crop to be forced into the baling chamber 18 through a crop inlet 24 by means of a loading fork assembly 36. At a forward lower position of the supply channel 26, a spring-loaded flap 38 is mounted, free to pivot, that pivots as a function of crop contained in the supply channel 26, until this reaches a desired density, in order to effect activation of a circuit to supply current to an electrical control circuit, not shown, which establishes corresponding drive connections which initially have the effect that the retaining arrangement 34 moves in such a way that it retracts the fingers 32 from the retaining position into the position shown in FIG. 1, and then activates the loading fork assembly 36 in such a way that thereupon the compression fork 30 is slid through the supply channel 26 and moves the load of crop into the baling chamber 18. Once the load of crop has been forced into the baling chamber 18, a piston mechanism 40, that is mounted to a forward location of the frame 12, is actuated in a controlled sequence after the loading fork assembly 36, in order to move the crop to the rear into the baling chamber 18, where it is compressed in a stack, as is well known in the state of the art. After the stack of compressed material has reached a predetermined length, a needle assembly 42, which includes several separate curved needles 68, is actuated in order to deliver binding twine to a corresponding number of knot tying devices, not shown, that operate in such a way that they lay lengths of twine about the predetermined length of the stack in order to form a bale 44 that is ready for unloading, which occurs when it is forced out of the rear end region of the baling chamber 18 by a part of a bale 46, when its length is increased by new loads of crop being forced into the baling chamber 18. Since the invention concerns the repositioning of the baling chamber 18—as is explained below—the amount of the crop supplied could be made to conform to the immediate size of the baling chamber 18.

Referring again to the piston mechanism 40, it can be seen that the latter includes a baling piston 48 that is arranged for a back and forth movement in the baling chamber 18 between a retracted position ahead of the crop inlet 24 and an extended position beyond the crop inlet 24 (see FIG. 1). This movement of the baling piston 48 has the result that loads of harvested crop, that are introduced from the supply channel 26 into the baling chamber 18, are compressed against a stack of harvested crop, which includes the partially formed bale 46 and/or the complete bale 44. Furthermore the piston mechanism 40 contains a driver 50 configured as an actuating arrangement, that can be extended and retracted, which is shown here as a double-acting hydraulic cylinder-piston unit, whose cylinder end is anchored with a pin 52, free to pivot, on the frame 12 at a point above the compression fork 30. The piston end of the drive 50 is connected at a connecting point 54 to a device such as a pin at a location between opposite ends of a first steering arm 56 used as a crank arm, whose forward end region is connected, free to pivot, at a bearing location 58 on the frame 12. A rear end region of the first steering arm 56 is connected at a bearing location 60 to a device such as a pin on a forward end region of a second steering arm 62 operating as a connecting rod, whose rear end region is connected at a bearing location 64 by means of a device such as a pin with the baling piston 48. It should be noted here that the connecting pins of the bearing locations 58 and 64 are arranged along a line of centers that lies along or approximately along a longitudinal centerline of the baling chamber 18. This has the result that the reacting force of the harvested crop that acts upon the baling piston 48, is substantially absorbed by the driver 50, when the first and the second steering arm 56 and 62 are located along a line, which is the case when the baling piston 48 is located in its rear end position. Furthermore it should also be noted that the two steering arms 56 and 62 could be configured in each case as a pair of steering arms spaced at a distance to each other in the transverse direction. The driver 50 would then be connected at the connecting point 54 (pin) at a point between the pair of steering arms 56, that form the first steering arm 56. It can therefore be recognized that the baling piston 48 forms the slider of a slider crank mechanism that includes a first steering arm 56 as the crank arm, and a second steering arm 62 and the steering arms 94 as connecting rods. Although the linkage formed by the steering arms 56, 62 and 64 does not move beyond a dead center position, it could be characterized as a toggle link mechanism or a toggle link. Although the preferred embodiment shows a driver 50, that is connected to the first steering arm 56 at a point between opposite ends of the first steering arm 56, the driver could be connected at any point between the bearing location 58 and the bearing location 64; for example, the driver 50 could be connected to the pin 60 or at a point along the length of the second steering arm 62, where the operation is in a better condition than that of the known arrangement, in which the actuation arrangement is connected directly to the baling piston 48.

Further details of this baler 10 are described in EP-A2-0 940 072, whose disclosure is hereby incorporated herein. It should be noted that in place of this special drive with a hydraulic motor, a conventional crank drive can be applied equally well.

FIGS. 2 through 5 refer only to the configuration of the baling chamber 18 and the baling piston 48 that is guided in it. The uniqueness of this invention lies in the fact that the cross section, in particular the height, of the baling chamber 18 can be varied in order to produce bales 44 of differing heights and thereby also of differing mass.

For this purpose the upper part of the housing 20 is arranged so as to be repositioned in height, as will be explained below on the basis of FIGS. 4 and 5.

The upper part of the housing 20 is equipped with a cover 21, that is configured in conventional manner as a heavy sheet metal component, that is relatively stiff in bending and preferably extends as a one-piece component over the entire length of the baling chamber 18. On the upper side of the upper part of the housing 20 and to the rear of the supply channel 26, a knot tying device assembly 66 is provided in known manner, into which the needles 68 of the needle assembly 42 can penetrate. Each side of the needle assembly 42 includes a needle support arm 70, that can be pivoted in a vertical plane and moves the needles 68 through the baling chamber 18 with the twine, not shown, to the knot tying device assembly 66, as soon as a bale 44 is to be bound. The cover 21 is carried at various points along its length by a yoke 72, which forms a part of a repositioning arrangement 74 located at each point and that also includes a base body 76. Slots 82 are provided in the cover 21 in the path of movement of, and extend in the direction of movement of the baling piston 48. In order to insure that the stiffness of the cover 21 is adequate in this region, the cover 21 is configured with relatively thick walls or it could be constructed with reinforcing sheet metal components or the like.

The housing bottom 23 is formed in conventional manner from steel sheet metal that may be profiled, as shown, if necessary, and which extends over the entire length of the baling chamber 18 and is in contact, without movement, with the base body 76 of each repositioning arrangement 74. While the cover 21 is generally closed, the bottom 23 is interrupted by the crop inlet 24 for the supply channel 26 and the inlet opening (not shown) for the needles 68. The cover 21 and the bottom 23 extend generally parallel to each other. Nevertheless, in the rear outlet region for the bale 44, adjustable flaps are provided, that are not shown but are well known, which give the bale 44 a certain resistance to movement.

The piston mechanism 40 includes the baling piston 48, that can be shifted between two end positions by means of the driver 50 as is described in EP-A2-0 940 072. In the preferred embodiment, the baling piston 48 is subdivided into an upper part 78 and a lower part 80, that are either configured separately from each other and are rigidly connected to each other or are formed as a one-piece component, as illustrated.

The upper part 78 is composed generally of transversely spaced, parallel, upright ribs 84, that extend principally in the direction of movement of the baling piston 48. The height of the ribs 84 is dimensioned in such a way that in every position of the cover 21 they extend through the slots 82. The number of ribs 84 is selected in such a way that a relatively closed conveying surface of the baling piston 48 results and the spaces between the ribs 84 are relatively small. In the selected embodiment, nineteen ribs 84 are present. In other embodiments, there could be more or fewer. The width of the ribs is selected in such a way that they can be engaged in the slots 82 with relatively little play.

The lower part 80 is configured as a completely closed box. As a deviation from this configuration the lower part 80 may also be open downward and/or on the left side as seen in FIG. 1. On the side walls of the lower part 80, journals 88 are provided with rolls 90 supported in bearings, free to rotate, on the journals, in particular several in a row at equal heights. On the side of the piston 40 facing the crop to be baled, i.e., the rear side, compression means, not shown, channels for the penetration of the needles or the like can be provided. The steering arm 62 preferably engages in a joint at the center of the lower piston part 80. The bearing location 58 that connects the first steering arm 56 in a joint is configured to be adjustable in height as well as in the longitudinal direction of the baling chamber 18, for example, on an inclined plane in such a way that both steering arms 56 and 62 in their extended position extend in the longitudinal center plane of the baling chamber 18. Nevertheless, this is only one preferred embodiment, that can frequently be omitted. Depending on the configuration of the guidance of the baling piston 48, the steering arms 56 and 62 can also engage off center of the baling chamber 18, that is, the bearing location 58 of the steering arm 56 remains unchanged.

On each side, a side wall 96 extends between the cover 21 and the bottom 23, which engages a slot 98 in the side legs of the yoke 72, so as to be able to slide vertically. The side walls 96 extend, fixed rigidly or removable, to the side outside of the cover 21 and are connected to the base body 76.

The yoke 72 is configured as an inverted "U" and manufactured from tubing material or as a weldment. Each vertical leg of the yoke 72 is provided with a slot 98 and is rigidly connected over a bridge 86 with the other vertical leg. At the lower end of each leg of the yoke 72, a connection 104 is provided for a servo motor 106, that will be described in greater detail below. In place of the servo motors 106, other repositioning mechanisms could be used, for example, levers, threaded spindles etc. The cover 21 is rigidly attached to the inside of the legs of the yoke 72.

The base body 76 is configured in the shape of a "U", whose legs extend upward alongside the legs of the yoke 72. Between the legs of the base body 76, the bottom 23 is in contact with, and connected to, the base body 76. At approximately half the height of the legs, a guide 108, configured as a "U"-shaped rail, is attached on each side on or in the legs, which extends parallel to the bottom 23. These guides 108 receive the rolls 90 of the lower part 80 within themselves, free to rotate. The side walls 96 extend upward erect above the guides 108. In the upper region of the legs openings 92 are provided through which journals 94 extend that engage the needle support arm 70 on the yoke 72, free to move. While the bottom of the base body 76 can also be formed from a tube, a rail, a weldment or the like, its legs are configured as vertical guides that contain an interior space 110. At the bottom of each interior space 110, a connection 104 is also provided for the other end of the servo motor 106. In the region of the interior space 110 located above it the legs of the yoke 72 are engaged so as to slide, free to move vertically.

The servo motors 106 extend between the bottom of the interior space 110 and the lower end of the legs of the yoke 72 and are connected over each of the connections 104 to these in a positive lock. The servo motors 106 may be configured as hydraulic motors or as electric motors, which, however, may depend on the forces to be transmitted, the space available and the like. It is necessary, however, to guarantee that during a repositioning process all servo motors 106 cover exactly the same path, so that there is no warping between each of the yokes 72. The servo motors 106 are remotely controlled, for example, from the vehicle towing the baler 10. While in the present embodiment the servo motors 106 are assumed to be double acting hydraulic motors, in other embodiments single-acting servo motors 106 could also be used, that are again retracted downward either on the basis of spring force or the force of gravity acting on the yokes 72.

On the basis of the above description the result is the following configuration and the following operation.

The bottom 23 and the guides 108 are inserted and fastened to the base body 76. Following this the servo motors 106 are inserted into the interior spaces 110, connected with the base body 76 and connected to a hydraulic system, not shown. Then the baling piston 48 with its rolls 90 is slid into the guides 108 and the steering arm 62 is connected with the baling piston 48. Following this, the cover 21 is laid upon the baling piston 48, so that the ribs 84 extend through the slots 82. Subsequently, the yoke 72 is slid into the interior spaces 110 and connected to the cover 21 and the servo motors 106. Finally the journals 94 are inserted through the openings 92 and fastened to the yoke 72 and connected to the needle support arms 70.

Figure 4:
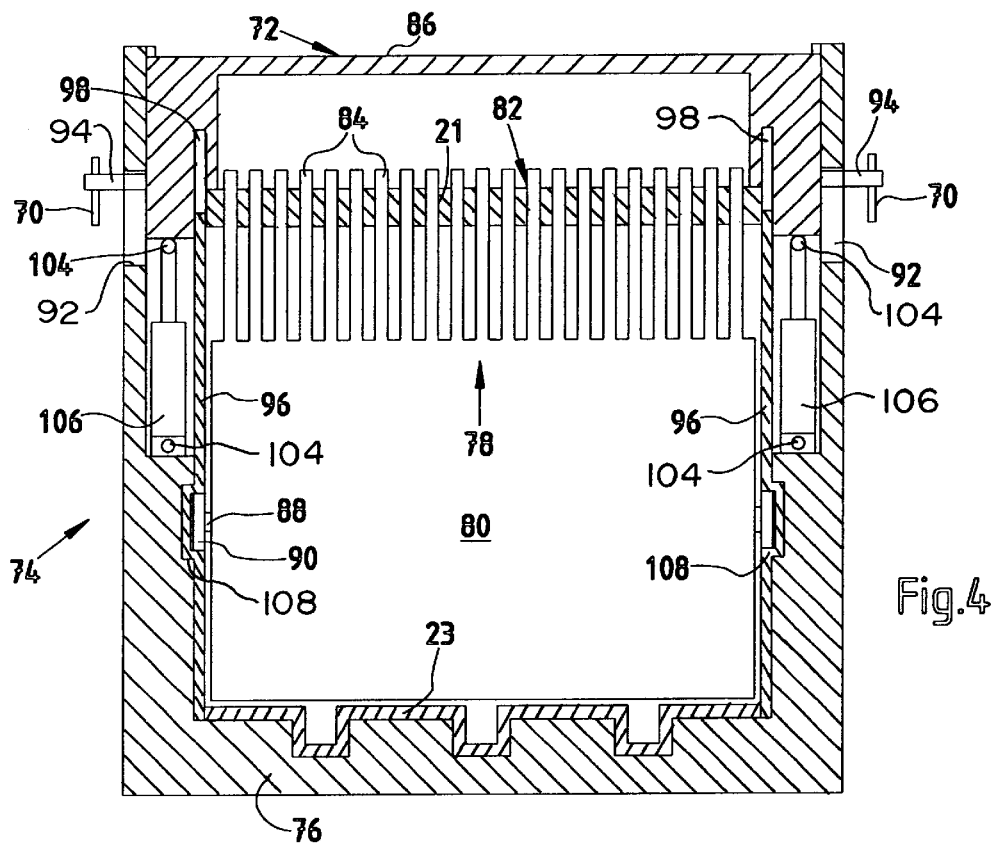
FIG. 4 is a vertical sectional view taken along line 4—4 of FIG. 1, and showing the baling chamber in its maximum height condition.
Figure 5:
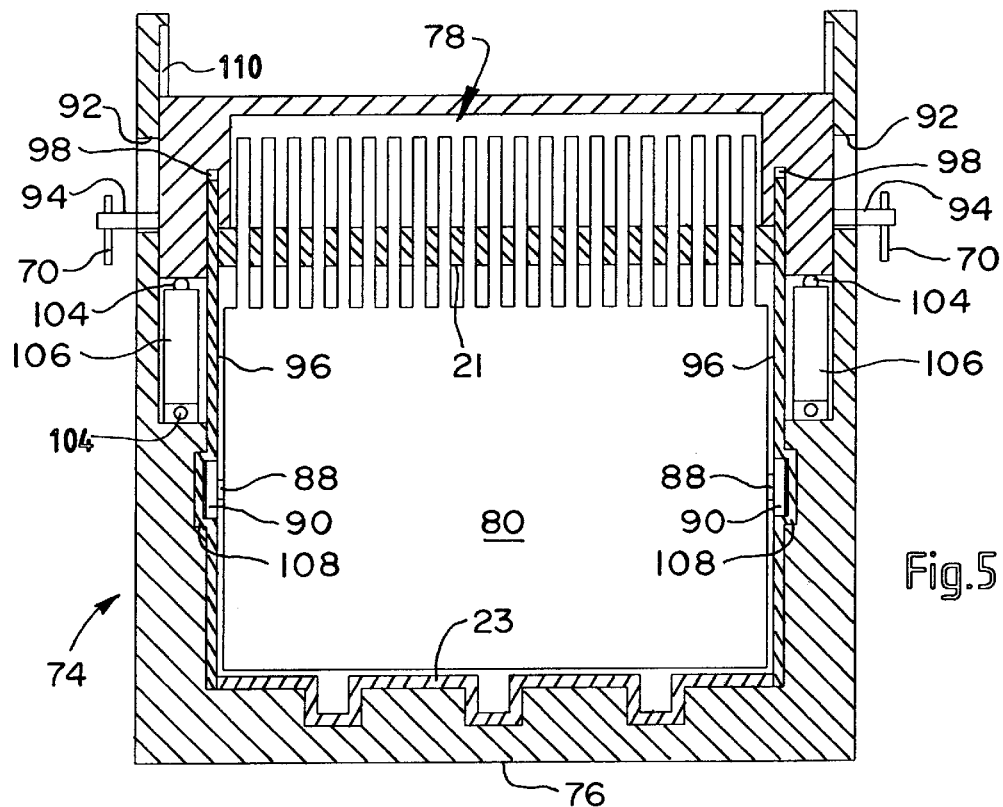
FIG. 5 is a view similar to that of FIG. 4, but showing the baling chamber in its minimum height condition.

According to FIGS. 2 and 4, the baling chamber 18 can be adjusted so as to occupy a maximum height condition, and, according to FIGS. 3 and 5, it can be adjusted to occupy a minimum height condition.

The further description begins with the assumption that it is desired to adjust the baling chamber from its maximum height condition, shown in FIGS. 2 and 4, to its minimum height condition, shown in FIGS. 3 and 5, this being performed as follows.

The servo motors 106 are retracted synchronously and pull the yokes 72 downward, whereby the baling chamber 18 is lowered. Simultaneously the bearing location 58 is shifted, so that the stroke of the baling piston 48 and the position of the steering arm 56, 62 remains unchanged with respect to the baling piston 48.

As a result of the attachment of the needle assembly 42 to the yoke 72 or the upper housing part 20, the former also moves upward or downward and maintains the spacial relationship to the knot tying device assembly 66.

While the present embodiment is initially based on the assumption that the upper housing part 20 is movable and the lower housing part 22 is fixed, this could also be the reverse, where then nevertheless the supply channel 26 and the components connected to it would have to be modified accordingly. Finally all side walls, the cover 21 and the bottom 23 could also be repositioned individually or in unison.

Having described the preferred embodiment, it will become apparent that various modifications can be made without departing from the scope of the invention as defined in the accompanying claims.

What is claimed is:

1. In a baler having a baling chamber configured for forming parallelepiped bales and having a baling piston mounted for reciprocating within a forward region of said baling chamber, the improvement comprising: said forward region of said baling chamber including parallel upper and lower walls, with said upper wall being mounted for selective movement towards and away from said lower wall between maximum and minimum spaced positions relative to said lower wall; said upper wall being provided with a plurality of transversely spaced, parallel slots extending lengthwise of said baling chamber; said baling piston being provided with an upper section defined by a plurality of ribs respectively received in said plurality of slots in said upper wall; and an actuator arrangement being coupled to said upper wall for adjusting said upper wall between said maximum and minimum spaced positions, whereby said ribs will accommodate said movement of said upper wall toward and away from said lower wall.

2. The baler, as defined in claim 1, and further including at least two repositioning arrangements surrounding said baling chamber at spaced locations lengthwise of said baling chamber; each repositioning arrangement including a top part defined by a yoke having opposite legs secured to said upper wall, and a U-shaped base body having opposite legs extending vertically beside said opposite legs of said top part and defining a vertical guide surface receiving said legs of said yoke for sliding vertically therein; said baling chamber including opposite, vertical side walls having respective upper regions engaged with opposite sides of said upper wall; said yoke including downwardly opening slots respectively formed in said opposite legs of said yoke in vertical alignment with said vertical side walls; and said actuator arrangement including an extensible and retractable motor coupled between each leg of said base body and each leg of said yoke, whereby operation of said actuator arrangement will result in said upper wall moving vertically relative to said opposite side walls.

3. In a baler having a baling chamber structured for forming parallelepiped bales and having a baling piston mounted for reciprocating within a forward region of said baling chamber, the improvement comprising: said forward region of said baling chamber including opposite first and second parallel walls, with said first wall being mounted for movement toward and away from said second wall in order to adjust a dimension of a vertical cross section taken through said first wall; said first wall being provided with a plurality of longitudinally extending, parallel slots; an actuator arrangement being coupled to said first wall for moving it towards and away from said second wall; and said baling piston including a plurality of ribs respectively received in said slots, whereby movement of said first wall relative to said second wall will be accommodated by said ribs.

* * * * *